United States Patent [19]

Krieg et al.

[11] Patent Number: 5,057,370
[45] Date of Patent: Oct. 15, 1991

[54] ELECTRICALLY CONDUCTING SOLID PLASTICS

[75] Inventors: Manfred Krieg; Armin Meyer, both of Darmstadt; Winfried Wunderlich, Rossdorf; Rainer Friederich, Biebesheim, all of Fed. Rep. of Germany

[73] Assignee: Rohm GmbH Chemische Fabrik, Darmstadt, Fed. Rep. of Germany

[21] Appl. No.: 501,957

[22] Filed: Mar. 29, 1990

Related U.S. Application Data

[63] Continuation of Ser. No. 259,431, Oct. 11, 1988, abandoned, which is a continuation of Ser. No. 935,201, Nov. 26, 1986, abandoned.

[30] Foreign Application Priority Data

Dec. 7, 1985 [DE] Fed. Rep. of Germany ....... 3543301

[51] Int. Cl.$^5$ .................. B32B 27/14; B32B 27/18; H01C 1/24
[52] U.S. Cl. .................... 428/403; 252/510; 252/511; 264/61; 264/104; 264/105; 427/213; 427/222; 428/323; 428/327; 428/407; 524/495; 524/496
[58] Field of Search .............. 428/323, 403, 407; 427/212, 213, 222; 106/307, 308 R; 252/509, 510, 511; 264/104, 105, 331.15; 524/495, 496

[56] References Cited

U.S. PATENT DOCUMENTS

| | | | |
|---|---|---|---|
| 2,761,854 | 9/1956 | Coler . | |
| 3,377,313 | 4/1968 | Jupa et al. | 524/496 |
| 4,097,656 | 6/1978 | Dany et al. | 524/496 |
| 4,098,945 | 7/1978 | Oehmke | 428/327 |
| 4,350,652 | 9/1982 | Theysohn et al. | 264/104 |
| 4,451,536 | 5/1984 | Barlow et al. | 524/496 |
| 4,526,952 | 7/1985 | Zeitler et al. | 524/496 |
| 4,545,926 | 10/1985 | Fouts, Jr. et al. | 524/495 |
| 4,579,611 | 4/1986 | Broady | 252/511 |
| 4,581,158 | 4/1986 | Lin | 252/511 |
| 4,601,848 | 7/1986 | Sakai et al. | 252/509 |

FOREIGN PATENT DOCUMENTS

| | | |
|---|---|---|
| 723598 | 2/1955 | United Kingdom . |
| 858530 | 1/1961 | United Kingdom . |
| 929733 | 6/1963 | United Kingdom . |
| 2076420 | 2/1981 | United Kingdom . |

Primary Examiner—George F. Lesmes
Assistant Examiner—Christopher Brown
Attorney, Agent, or Firm—Oblon, Spivak, McClelland, Maier & Neustadt

[57] ABSTRACT

The invention relates to electrically conducting solid plastics, the conductivity of which is attributable to their containing finely divided particulate, conducting substances. The electrically conducting solid plastics are comprised of or contain a polymer such as polymethyl methacrylate having a discrete fine-particle structure, and the polymer particles of the polymer are "doped", at least on their surface, with at least one electrically conducting substance such as carbon black in an amount which establishes electrical conductivity. The conducting substance(s) are present in the form of a plurality of conducting particulate solid bodies, and wherein the condition is imposed that the glass temperature (Tg) of the polymer is not exceeded when the conducting substance is mixed with the polymer particles.

12 Claims, No Drawings

ELECTRICALLY CONDUCTING SOLID PLASTICS

This application is a continuation of application Ser. No. 259,432, filed on Oct. 18, 1988, now abandoned, which is a continuation of application Ser. No. 06/935,201, filed on Nov. 26, 1986, now abandoned.

BACKGROUND OF THE INVENTION

1. Field of the Invention

The invention relates to electrically conducting solid plastics based on polymers which are themselves electrically insulating, and wherein the plastics contain particulate, electrically conducting substances.

2. Discussion of the Background

Ordinarily, the term "plastic material" is associated with the property of high resistance to passage of electric current, i.e. insulation. Conductivities of such materials are in the range $G=10^{-10}$ to $10^{-18}$ (ohm-cm)$^{-1}$. There has been substantial industrial interest in the insulating properties of plastics. However, occasions arise when it is desirable for polymers to be electrically conducting. Polymers which have, for example, regularly alternating double and single bonds as the principal feature of their bonding systems can achieve sigma-values, i.e., units of conductance in $\Omega-1$ in the metal or semiconductor range, when electron acceptors or electron donors are incorporated in them. See Weddigen, G., *Physik in unserer Zeit*, 14, 4:98; (1983) and "Kirk-Othmer", 3rd Ed. John Wiley, Vol. 18 pp. 755–93 (1982). Such polymers include, for example, polyacetylene, polypyrrole, and polysulfur nitride. Addition of "conducting fillers" can result in increases in the conductivity of polymers which are inherently insulators, such that technically useful conductivities are achieved. Candidates for such fillers include carbon black, lead, and silver. According to Weddigen (loc. cit.) one can reproducibly achieve only a narrow conductivity range, i.e., between $10^{-4}$ and $10^1$ (ohm-cm)$^{-1}$ with the filler method. The content of conducting filler is generally 10 to 40 wt. %. At relatively low filler concentrations (about 5 wt. %) the conducting particles do not yet statistically form conduction paths within the insulator, so that they do not result in overall conductivity. When the filler concentration is increased, there occurs an abrupt incidence of statistically frequent contacts of conducting filler particles, and consequently an abrupt increase in conductivity to a level close to that of the filler material itself.

At high field strengths, the lines of current flow first run along the paths formed by the filler particles which are in contact with each other. At low field strengths, filler particles which are close but not touching do not contribute to the current through the solid plastic; while at high field strengths there is dielectric breakdown. Such a conductor no longer obeys Ohm's law.

Another disadvantage of the "filler method" is that when the filler is incorporated, the conductor filler particles are not uniformly distributed, due to their density being different from that of the insulating polymer matrix. They are more concentrated in the lower regions. In this regard, "Kirk-Othmer" (loc. cit., p. 767) states: "Doped polymers exhibit a host of additional difficulties associated with the disorder and gross inhomogeneity of the dopants. Thus, achievement of the goal of making synthetic metals from conducting polymers faces hurdles that were unanticipated as little as a decade ago." Homogeneity of distribution of the conductivity carriers thus appears to be an essential prerequisite for industrial use of polymeric conductors. The cited article by Weddigen makes it clear that future prospects are not good for the use of plastic to which electrically conducting filler have been added.

SUMMARY OF THE INVENTION

Accordingly, one object of the present invention is to provide a means by which doped polymer substrates will have a maximum or at least technically adequate electrical conductivity, with a low content of conducting filler and without detriment to the mechanical properties.

A further object of the invention is to devise a means of manufacturing molded pieces from these doped polymers substrates with the use of ordinary forming, machining and processing methods.

A further object of the invention is to produce doped polymer substrates while keeping the amount of conducting filler as low as possible, to avoid excess cost and degradation of the mechanical properties of the polymer.

These objects and other object of the invention which will become apparent from the following specification have been achieved by the novel electrically conducting solid plastics of the present invention, comprising (i) a polymer having a discrete fine-particle structure; and (ii) at least one electrically conducting substance, wherein the substance is in the form of a plurality of conducting particulate solid bodies; and wherein the glass transition temperature of the polymer is not exceeded when the conducting substance is mixed with the polymer particles.

DETAILED DESCRIPTION OF THE PREFERRED EMBODIMENTS

In view of the importance of homogeneous distribution of the conducting particles, it seemed to be indicated to seek the maximally homogeneous distribution of the particles in the polymer matrix. The research of the present inventors with acrylates as the polymer matrix led to the result that significant conductivity appeared with homogeneously distributed conducting carbon black only at very high concentrations of the carbon black (>15–25 wt. %). The addition of such substantial amounts of carbon black in polymethyl methacrylate is in practice virtually impossible, due to thixotropy, and results in highly friable materials. It is expected that the same basic situation will apply with other polymer substrates.

In European Patent 0 013 753, a method of preparing electrically conducting polyolefin molded pieces is described wherein the conducting carbon black is applied to the surface of polyolefin particles by fusing the carbon black to the surface. Apparently the technical success of the method depends closely on the crystallizability of the polyolefin. Non-crystallizing plastics are thus not candidates for the process.

In the present invention, we intentionally departed from the prevalent teaching in the art to the effect that a homogeneous distribution of the conducting particles (conducting carbon black) is absolutely required in order to achieve technically satisfactory conductivity characteristics in polymers.

It has been discovered that technically satisfactory conductivity characteristics are substantially satisfied by plastic materials which are solid at room temperature and which are comprised of or contain a polymer having a discrete fine-particle structure, particularly in the form of beads. The polymer particles are "doped", at least on their surface, with at least one electrically conducting substance in an amount which establishes electrical conductivity. The conducting substance(s) being present in the form of a plurality of particulate solid bodies having particle sizes as a rule <500 micron, and wherewith the condition is imposed that the glass temperature (Tg) of the polymer is not exceeded when the conducting substance is mixed with the polymer particles. The sizes and numbers of the particles may be determined according to Winnacker-Kuechler, "Chemische Technologie", 4th Ed., pub. Hanser Verlag, Vol. 1, pp. 46–53 (1984). Values of Tg may be obtained, e.g., from Brandrup-Immergut, "Polymer Handbook", John Wiley (1975). Thermoplastics are preferred as the solid plastic polymers.

Thermoplastics are to be understood according to the usual definitions, namely plastics which soften when sufficiently heated, whereby they become deformable and eventually flowable; which re-harden upon cooling down from the heated state; and which do not lose this behavior even with repeated heatings. See also DIN 7724 (DIN signifies German Industrial Standard).

Instead of the glass transition temperature Tg, one may use 30° C. below the dynamic vitrification temperature, ($Tg_{dyn} - 30$° C.), since as a rule $Tg_{dyn}$ is about 30° C. higher than Tg.

The glass transition temperature Tg is determined by known methods, e.g. by differential scanning calorimetry (DSC). The effect of individual monomers on the resulting Tg is in general known and/or can be predicted. The same is true of the dynamic vitrification temperature $Tg_{dyn}$. See Vieweg-Esser, "Kunststoff-Handbuch", Vol. IX, Carl Hanser Verlag, pp. 333–40 (1975) and "Kirk-Othmer", 3rd Ed., John Wiley, Vol. 1, pp 387–89 (1978).

In general, $Tg_{dyn} > 0$° C. $Tg_{dyn}$ is determined according to DIN 7724 and DIN 53 445. A practical temperature region for carrying out the mixing may be the room temperature region (20+/−3° C.).

Preferably, plastics are used which have *no* crystalline and no partially crystalline constituents in the temperature range above 16° C., i.e., at or above room temperature.

As a rule, the inventive doped polymers have a volume resistance in the range about 10 ohm, preferably in the range $10^3$–$10^9$ ohm.

The plastic may be produced from the doped polymer particles or it may be comprised of a matrix polymer with the doped polymer particles distributed therein. In the latter case, care must be taken to ensure that the amount of doped polymer particles and the type of their distribution will produce the desired conductivity. Preferably, the matrix polymer and the polymer particles belong to the same polymer class. However, they may be of different classes if they have sufficient compatibility. See "Kirk-Othmer", 3rd Ed., loc. cit., Vol. 18, pp. 443–78. Any of the following types of plastic is particularly suitable for the matrix polymer. Acrylic resins, particularly polymethyl methacrylate (PMMA) and copolymers of PMMA; PVC and polyvinylidene chloride (with Tg generally $\geq 350$° K.); Polystyrene (with Tg generally $> 370$° K.); Polyolefins; Fluorinated vinyl polymers (with Tg generally $> 350$° K.); Polyphenylene oxide (with Tg generally $\geq 415$° K.); Polyamides (with Tg generally $> 415$° K.); Polyacetals; Polycarbonates (with Tg generally $> 380$° K.); ABS polymers; Epoxy resins; Polyvinyl esters (with Tg generally $\geq 305$° K.); Polyacrylonitrile (with Tg generally $\geq 370$° K.); and mixed polymers and mixtures of polymers.

Also of particular importance is the use of the present technique for manufacturing high impact compositions. The following materials, as examples, may be employed in manufacturing high impact compositions; polybutyl acrylate; modified PMMA; high impact polystyrene modified with polybutadiene; and styrene-acrylonitrile copolymer modified with polybutadiene.

Candidates for the matrix polymer and/or the polymer particles generally meet with the following specifications. In general, plastic materials designated as "molding compounds" are suitable. Molding compounds are used as starting materials for stressless flow-molding of plastics under the action of pressure and heat. (See DIN 7708, p. 1.)

Particularly preferred materials are acrylic resins, i.e. polymers and copolymers based on esters of (meth)acrylic acid, especially methyl methacrylate (MMA). Preferably the resins contain MMA in the amount of at least 50 wt. %, possibly along with the other esters of (meth)acrylic acid, particularly esters with $C_1$–$C_6$ alcohols; and/or along with (meth)acrylonitrile, or other vinyl compounds as comonomers. See Rauch-Puntigam, H., and Voelker, Th., "Acryl—und methacryl-verbindungen", Springer-Verlag (1967); and Vieweg-Esser, "Kunststoff-Handbuch", Vol. IX, Carl Hanser Verlag (1975).

Depending on the use domain envisioned, the acrylic resins may also be comprised of functionalized monomers in some proportion (as a rule <20 wt. %). Examples of such monomers are (meth)acrylic acid; heterocyclic vinyl compounds; alkoxy-, hydroxy-, or alkyl dialkylamine esters of (meth)acrylic acid, and amides of (meth)acrylic acid, with as a rule, not more than 10 C atoms in the ester part or amide part of the monomers. (See Ullmann's Encyclopaedie der technischen Chemie, 3rd Ed, pp. 108—110, Urban & Schwarzenberg, 1963)

In general, the molecular weight is in the range $10^4$–$2.5 \times 10^5$. The acrylic resins generally have a dynamic vitrification temperature ($Tg_{dyn}$) in the range 120°–140° C. according to VDE 0302/III or DIN 53 458.

Suitable materials, in addition to polymers in bead form, are acrylate molding compounds, especially PMMA molding compounds (DIN 7749). One might mention powders or fine granulates (mean particle diameter in the range 10–1000 micron).

For example, PMMA products bearing the trade name Plexigum ®, supplied by Roehm GmbH, may be used. These products may be used in clear (glass-clear), white or colored versions.

Also, polycarbonate is well suited for the plastic material. The term "polycarbonates" should be understood to mean conventional polycondensation products of 4,4'-(alkylidene)bisphenol ("bisphenols"), particularly 4,4'-(2,2-propyl)bisphenol, with derivatives of carbonic acid. (See DIN 7744.) Their molecular weight is generally in the range 20,000–60,000 preferably 20,000–30,000. As a rule their dynamic vitrification temperature ($Tg_{dyn}$) is about 160° C. See "Kunststoff-Handbuch", vol. IX, Carl Hanser Verlag, p. 310; and "Kirk-Othmer", 3rd Ed., Vol. 18, John Wiley, pp. 479-97(1982).

In addition, various commercially available molding compounds may be employed. Thus, for example, the colorless products Makrolon ® 1158 and 1143 are suitable, as well as colored products such as the opaque beige Makrolon ® 3203, supplied by the firm Bayer, of Leverkusen. The specific volume resistance of polycarbonates is generally $>10^{15}$ ohm-cm.

Further, polyphenylene oxide is usable for the plastic material; particularly, polyphenylene oxide prepared from 2,6-dimethylphenol via oxidative coupling. The dynamic vitrification temperature ($Tg_{dyn}$) as a rule is in the range 130°–150 ° C. See "Ullmanns Encyklopaedie der techn. Chemie", 4th Ed, Vol. 15, pp. 429–31; and ibid, 3rd Ed., Supplementary Vol., pp. 273–276. As an example, the product Noryl EN 130 ® beige, supplied by General Electric Corp., may be used.

Also suitable is polyvinyl chloride (PVC), particularly with a K-value between 55 and 80 as determined according to DIN 53 726 (See Vieweg-Krekeler, "Kunststoff-Handbuch", Vol. 2, Part 1, pub. Carl Hanser Verlag, p. 58 (1983)) and a viscosity index J between 74 and 170 cm$^3$/g. Particularly recommended are PVC molding compounds according to DIN 7748 E and 7749 E. Hard PVC which is usable has K-value generally about 57 to 65; soft PVC about 65–70. Generally, the $Tg_{dyn}$ is 50°–80° C. Such products are commercially available as granulate or powder. An example is the PVC granulate "LA 206" of Chemische Werke Huels.

Other suitable polymers are polyamides, i.e., polymers containing amide groups which are sequentially connected by —(CH$_2$)$_n$— chains. In general, pure polyamides are crystalline polymers. See R. Vieweg, "Kunststoff-Handbuch", Carl Hanser Verlag, Vol. 6, pp. 545 ff (1966), and "Kirk-Othmer", 3rd Ed, Vol. 18, pub. John Wiley, pp. 406-36 (1982). Examples of polymers suitable as polyamide molding compounds (DIN 16 773) are epsilon-caprolactam homopolymers (nylon 6), the polycondensate of 11-aminoundecanoic acid (nylon 11), the homopolymer of omega-laurolactam (nylon 12), the homopolycondensate of hexamethylendiamine and adipic acid (nylon 66), the homopolycondensate of hexamethylenediamine and sebacic acid (nylon 610), the homopolycondensate of hexamethylenediamine and 1,12-dodecanedicarboxylic acid (nylon 612), and the homoplyconsensate of hexamethylenediamine and terephthalic acid (nylon 6-3-T).

In general the polyamide molding compounds have a range of viscosity values (DIN 16 773) of from less than 130 to 260 cm$^3$/g. The viscosity value is determined in m-cresol as solvent, according to DIN 53 727. The specific volume resistance of the polyamide molding compounds is in the range $10^{14}$–$10^{17}$ ohm-cm, and the melting temperature $\geq 220°$ C.

Also, polystyrene can be advantageously employed. See Vieweg, R., "Kunststoff-Handbuch", Carl Hanser Verlag, Vol. 5, pp. 472 ff.

In general, the mean molecular weight of suitable polystyrene is in the range $2.2 \times 10^5$ to $2.5 \times 10^5$. The Vicat softening temperature of the polystyrene molding compounds is preferably in the range of $\geq 80°$ C. to over 110° C. (see DIN 7741 E). Polystyrene molding compounds are usually supplied commercially in the form of granulate (particle diameter 2–4 mm), beads, or powder. Particularly preferred is high impact polystyrene, i.e., with impact resistance (DIN 53 453) of $\geq 12$ kJ/m$^2$ at 30° C. A suitable high impact polystyrene is a uniform particle size polystyrene granulate, "427K", supplied by BASF, of Ludwigshafen FRG.

Also, polyolefins, such as polyethylene and polypropylene can be used. Polyethylene may be represented by the formula $$-CH_2-CH_2-_n$$

where n is 500–50,000. Polyethylene is partly crystalline, partly amorphous. Its density is 0.915–0.960 g/cc, depending on the crystallinity. Low density polyethylene (LDPE) and medium density polyethylene (MDPE) have densities less than 0.94 g/cc. See Vieweg, R., "Kunststoff-Handbuch", published by Carl Hanser Verlag., Vol. 4, pp. 285 ff. (1969).

Suitable polyethylene is primarily high pressure polyethylene, but low pressure polyethylene may also be used. See "Kirk-Othmer", 3rd Ed, John Wiley, Vol. 16, pp. 385–499. Often, polyethylene is characterized according to density (ASTM D 1248-78, Part 36). LDPE or LLDPE may be used. The melting index is often used as a characterizing parameter for the molecular weight ("MFI", according to DIN 53 735 or ASTM-Test D 1238-70). Soft polyethylene is particularly preferred. An example is "Lupulen 23 T 2171 ®", supplied by BASF, of Ludwigshafen. The electrical resistivity of LDPE is in the range $>10^{16}$ ohm-cm.

Also of interest are fluorine-containing compounds, particularly polytetrafluoroethylene (PTFE). See Vieweg, R., "Kunststoff-Handbuch", Carl Hanser, Verlag., Vol. 11, pp. 374 and 384. An example of a particularly suitable PTFE is Hostaflon ® granulate with uniform particle size, e.g., the product having trade designation "TFB", LB 7100".

Also of interest is the combination of polymers with inert inorganic fillers in fine dispersion in the polymers. The amount of such inorganic fillers may comprise up to 70 wt. % of the resulting plastic. Materials which may be used as inorganic fillers are, e.g., minerals of types which do not make any appreciable contribution to electrical conductivity, such as aluminum oxides and compounds derived from same, silicon dioxide and compounds derived from same, carbonates, sulfates, sulfides, phosphates, and oxides. In general, the particle size is $<200$ micron, preferably between 0.1 and 100 micron.

Polymer with Discrete Fine-particle Structure

The polymer particles of the polymer are generally fine solids in the particle size range 10–1000 micron, preferably 30–300 micron, particularly $<200$ micron, and especially 30–100 micron. The polymer particles can be brought to the desired degree of fineness by, e.g., crushing and/or grinding.

A relatively narrow particle size distribution is desirable. Thus, as a rule $>95\%$, preferably $>99\%$ of the particles should be in the above-mentioned particle size ranges. The particles may also be present in the form of a granulate particularly a uniform particle size granulate. The crushing/grinding may be carried out, for example, by means of roll mills, impact pulverizers, or milling-body mills. See Winnacker-Kuechler, "Chemische Technologie", 4th Ed., Carl Hanser Verlag, Munich, Vol. 1, pp. 86–93 (1984). Alternatively, the polymer particles may be produced directly by aqueous or nonaqueous dispersion or suspension polymerization techniques. See Houben-Weyl, "Methoden der organischen Chemie", 4th Ed., Georg Thieme-Verlag, Vol. 14/1 (1957); and Rauch-Puntigam, H., and Voelker, Th., "Acryl- und Methacrylverbindungen", Springer-Verlag, Berlin, pp. 208–13 (1967).

Data on particle sizes refer to the maximum dimensions of the particles which are preferably granule-shaped, but may also be plate-shaped, cylindrical, rod-shaped, or cube-shaped. Perferred are particles having relatively high uniformity.

The polymer particles are to be distinguished from the conductivity fibers of the state of the art (See "Kirk-Othmer", 3rd Ed, loc. cit., Vol. 18, p. 785.) Such fibers (carbon fibers, graphite fibers) are as a rule the result of pyrolysis of polymers. According to "Kirk-Othmer" (loc. cit., pp. 755–93), the use of elongated fibers has advantanges over compact flakes. The greater the ratio of length to width (or diameter), the better the results. Therefore, in the processing it is necessary to avoid applying high shear forces, to the extent practically possible.

The criteria mentioned above are satisfied to a high degree by polymer beads produced by suspension polymerization. In this technique, the monomers (disperse phase) are distributed in an antisolvent (continuous phase) by mechanical action (stirring), and are polymerized in this state. The polymer formed is primarily soluble in the monomers. The monomers form spherical droplets under the action of interfacial tension. In order to preserve the shape of the droplets during the polymerization and to prevent agglomeration of droplets, so-called "dispersing agents" (protective colloids) are added to the polymerization mixture. These are preferably substances which can be completely separated from the precipitated beads of polymer after the polymerization is completed.

The dispersing agent acts to stabilize the monomer droplets once they have formed, so that agglomeration or combination of droplets is practically impossible.

As a rule, water is used as the continuous phase. Monomers which are candidates for bead polymerization thus primarily comprise monomers which are insoluble to slightly soluble, and are polymerizable by radical polymerization. See "Houben-Weyl", 4th Ed., loc. cit., Vol. XIV/1, pp. 406–33. Particularly suitable are styrene and substituted styrene derivatives; vinyl esters of carboxylic acids (e.g., vinyl acetate); esters of (meth)acrylic acid; vinyl chloride, vinylidene chloride, and N-vinylcarbazole.

Candidates for the dispersing agents (suspension stabilizers) include water-insoluble salts of inorganic acids, e.g., barium sulfate or barium carbonate, or high molecular weight natural substances or synthetic polymers. The group of high molecular weight dispersing agents includes water-soluble colloids (e.g., polyvinyl alcohol), partially saponified polyvinyl acetate, methylcellulose, starch, gelatin, pectin, alkali salts of polyacrylic acid, or alkali salts of styrene/maleic anhydride copolymers or of vinyl acetate/maleic anhydride copolymers. See "Houben-Weyl", loc. cit., Vol. XIV/1, pp. 411–30. The weight ratio of aqueous to monomer phase is usually 2:1 to 4:1. In contrast to emulsion polymerization, a starter is employed in bead polymerization. The starter is to some extent soluble in the monomers but is insoluble in water. The amount of starter employed is usually 0.1–1 wt. %., preferably around 0.5 wt. % based on the total weight of the monomers. In known fashion, the size of the beads is chiefly controlled by the choice of technical process conditions, e.g., stirrer speed and the type and amounts of suspension stabilizers. The bead size, depending on requirements, may be adjusted to between 0.1 and 2 mm. The polymer beads used according to the invention are preferably not-crosslinked. For the purposes of the invention, the preferred bead diameter is in the range 30–500 micron, more preferably in the range 30–200 micron.

The procedure for carrying out the invention will be described with reference to polymer beads (as the form of the polymer particles) comprised of esters of (meth)acrylic acid. Esters of (meth)acrylic acid are among the preferred monomers for the polymer particles as they are for the matrix polymer; particularly methyl methacrylate. Other monomers, e.g., esters of $C_1$–$C_{18}$ alcohols, particularly esters of $C_1$–$C_8$ alcohols (e.g., ethyl acrylate, butyl (meth)acrylate, octyl (meth)acrylate, ethylhexyl (meth)acrylate, and benzyl (meth)acrylate), can also be used as monomers and particularly as comonomers; likewise polymerizable amides (e.g., (meth)acrylamide), nitriles (e.g., (meth)acrylonitrile), or bivalent monomers such as acid anhydrides (see U.S. Pat. Nos. 2,171,765 and 2,440,808). The consistency of the polymer is affected by the composition, in known fashion. Thus, depending on their softening temperature, acrylic acid esters yield soft or adhesive beads. In general, the dynamic vitrification temperature ($Tg_{dyn}$) as determined according to DIN 7724 and DIN 53 445 of the polymers in the particles is greater than 80° C. The effects of individual monomers on $Tg_{dyn}$ can be estimated. See Vieweg-Esser, "Kunststoff-Handbuch", Carl Hanser Verlag, Vol. IX, pp. 333–40(1975).

Preferred are beads containing methyl methacrylate in the amount of at least 50 wt. %, and up to 100 wt. %.

As a rule, two phases are employed, the water phase (a) and the monomer phase (b). In preparing the water phase (a), fully deionized water is preferably used, to which the other components are added after heating. The dispersing agents are added to the water phase.

In preparing the monomer phase (b), the customary polymerization additives such as initiators, regulators, etc. are dissolved in the mixture of the monomers used. Then, the monomer phase (b) is dispersed in the water phase (a), generally under stirring, and the polymerization is carried out generally at elevated temperature.

According to a preferred embodiment of the invention, the electrically conducting particles may be added in the form of conductive carbon black, graphite, or inorganic or organic pigments (e.g., iron oxide, titanium dioxide, etc.), with the addition being to the monomer phase. In this case, the content of conductive material as a rule is in the range 0.5–15 wt. %, preferably 1–5 wt. % (based on the total weight of monomers in the polymer beads). The conductive particles may be incorporated in the manner of, for example, Eur. OS 0 060 935.

If it is desired to control the molecular weight of the polymer in the polymer particles by adding a regulator, such a regulator is also added.

As a rule the bead polymerization is carried out by adding the initiator to the monomer phase (b) and then adding the latter to the water phase (a) heated to 50°–80° C. The end of the polymerization process can generally be recognized by a temperature drop from the maximum. In general the polymerization will take $2+/-1$ hr; as a rule of thumb, about $80+/-20$ min. Then the reaction mixture is heated for a certain additional period of time at a temperature in the region of the maximum temperature which was reached. $1+/-0.25$ hr may be used as a guideline for this additional time. The suspension stabilizer is then removed from the resulting bead suspension by, for example, filtration or decantation, and the beads are washed with fully deionized water. Preferably, the beads are dried with heating (below the softening point), at about 50° C. for example, preferably in a recirculating air drying-oven.

Doping of the Polymer Particles

The conductive substances: For the purposes of the present invention, the materials used as conductive fillers are those materials suitable according to the state of the art. See "Kirk-Othmer", 3rd Ed., loc cit., Vol. 18 p. 785.

Examples of such materials are carbon black (conducting carbon black), graphite, or metals (e.g., silver, copper, or zinc), chiefly in the form of powders (some of which are available commercially) or in the form of conducting short fibers. Conducting short fibers are understood to include metal fibers, carbon fibers, etc. (see "Kirk-Othmer", loc cit.). Preferably, the fiber lengths are <2mm, generally 0.1-1 mm.

Particle sizes (diameters) are generally in the range of 1-500 micron, particularly in the range 15-300 micron, for metals and graphite. Conducting carbon blacks are customarily characterized by the parameter "surface per unit weight", which for conducting carbon blacks is preferably on the order of 50-1500 $m^2/g$. Examples include the following conducting carbon blacks: "Corax L®" (150 $m^2/g$); and "Ketjen-Black®"(9-50-1200 $m^2/g$). Particle sizes are determined by known methods. See "Winnacker-Kuechler", loc cit.; and "Ullmanns Encyklopaedie der techn. Chemie", 4th Ed, loc cit., Vol. 5, pp 725-52. The conductive substances are used in amounts which result in the desired conductivity properties.

In general, the content of electrically conducting substances in the polymer (the polymer is comprised of the polymer particles and possibly of components comprising of a maxtrix polymer) is 0.01-20 wt. %, but the region above 10 wt. % is employed generally only in the case of doping with metals. The preferred content range of the conducting substance is 0.1-10 wt. %. For conducting carbon black, the preferred content is about 0.1-5 wt. %. Higher contents of conducting substance are possible as disclosed in the state of the art, but are almost certainly accompanied by disadvantages, e.g., with respect to the mechanical properties of the polymer. Various known methods are available for doping the polymer particles with the conducting substances.

a) Application of the Conducting Substance in a Fluidized Bed Process:

In applying the conducting substance to the polymer particles in a fluidized bed process, one preferably begins with a dispersion of the conducting substance in a vehicle liquid, i.e., a conductive varnish. The vehicle is generally comprised of a solvent, and possibly also of an emulsifier/adhesive agent or binder. Candidates for the binder include, for example, low molecular weight polymers such as pre-polymers, which are as a rule of the same type as the polymer particles. One generally starts with dispersions which contain a binder in the amount of 1-10 wt. % and conducting substance in the amount of 1-10 wt. %. The vehicles used are generally solvents or solvent systems, inorganic or organic, which dissolve the binder. Examples of these are water, alcohols (such as ethanol, tert-butanol, or isopropanol), and ketones (such as acetone). The apparatus used for the mixing is an apparatus customarily used for producing disperse mixtures. See "Ullmanns", 4th Ed., loc cit., Vol. 2, p. 259.

In the case of the bead polymers comprised of (meth)acrylate ester units, the binders may be, for example, polymers or copolymers of (meth)acrylic acid esters, in the molecular weight range $5 \times 10^4$ to $3 \times 10^5$, preferably $>2 \times 10^5$. The binders are comprised of the same types of monomer units as were described as suitable for the bead polymers, but are further comprised of adhesion-promoting monomers in an amount up to about 50 wt. %, preferably up to 20 wt. %. Examples of adhesion-promoting monomers are those corresponding to Formula 1:

wherein $R_1$ represents hydrogen or methyl; and $R_2$ represents an inert heterocylic group with 5 or 6 ring atoms, or else $R_2$ represents a group:

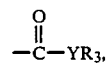

where Y represents oxygen or a group $-NR_4-$; and $R_3$ represents hydrogen, a hydroxyalkyl group with 2-6 C atoms, or a dialkylaminoalkyl group with 2-6 C atoms per ester unit and 1-4 C atoms per alkyl function, or a dialkylaminoalkyl group wherein the dialkylamino function is replaced by a heterocyclic group as is the case with $R_2$.

Examples of such adhesion-promoting monomers are 2-hydroxyethyl (meth)acrylate, hydroxypropyl (meth)acrylate, N-vinylpyrrolidone, and N-vinylimidazole.

The fluidized bed application technique as described in "Ullmanns", 4th Ed., loc cit., Vol. 3, pp. 433-460 may be used.

The further processing (e.g., hot pressure-forming, etc.) may directly follow the application by fluidized bed.

b) Application of the Conducting Substances in a Milling Process:

The conducting substance can also be applied to the polymer beads with the aid of a milling process, e.g. using strongly eccentrically running ball mills, particularly metal ball mills. For example, metal ball mills "Type 51" of the firm Retsch, D-5657 Haan, FRG, have proven suitable. The conducting substance and the polymer particles can be mechanically pre-mixed (e.g., in a tumbling mixer) and then charged to the metal ball mill. The duration and intensity of the mixing depend on the materials.

c) Introduction of the Conducting Substances in the Course of a Forming Operation on the Polymer Beads:

The conducting substance can also be introduced in the course of forming operations, e.g., during pressure-forming of the polymer beads to form "sintered" (pressure-formed) agglomerate plates and subsequent treating. The agglomerate plates thus formed may be treated, for example, by impregnation with a conductive varnish, or the still porous surface can be coated with conducting material. It is logical to carry out hot pressure-forming, in stages, to yield compact plates or molded pieces. One option is to perform the pressure-forming on continuously operating band presses.

It should be emphasized that the inventive electrically conducting plastics can be prepared without a multistage thermal program such as is required for the crystalline structures according to European Patent 0 013 753.

The inventive electrically conducting solid plastics have a conductivity which as a rule is in the range $10^{-1}$ to $10^{-9}$ (ohm-cm)$^{-1}$. The conductivity can be varied by the type and amount of doping, and thereby can be adjusted to the technolgical purpose at hand. The inventive plastics are suitable for a number of uses in which electrical conductivity plays a role. Of particular interest are cases where it is desired to avoid electrostatic charge buildup (from transmission apparatus or from carpeted floors), e.g., in regions of inflammable vapors or dusts, or near electronic equipment. Equipment, tools, containers, etc. to be used under such conditions are advantageously constructed of the inventive electrically conducting plastics.

Conductivities of $10^{-9}$ to $10^{-2}$ (ohm-cm)$^{-1}$ are required for applications intended to avoid buildup of static charges.

Another very important application of the inventive plastics is for electromagnetic shielding, e.g., shielding of any type of apparatus, particularly electronic or electronically controlled apparatus, measuring equipment, computers, electronic maintenance apparatus, etc., such shielding being against electromagnetic radiation to the surroundings and/or against exposure to electromagnetic radiation.

The conductive plastics should have conductivities $> 10^{-2}$ (ohm-cm)$^{-1}$ in order to provide effective electromagnetic shielding.

In contrast to the state of the art, the inventive conducting plastics have been observed to have a conductivity which increases continuously with increasing voltage.

The specific viscosities, $\eta_{sp}/c$, were determined (according to DIN 1342, 51 562, and 7745) in chloroform at 20° C., in a "Mikro-Ubbelohde" viscometer. See "Houben Weyl", Georg-Thieme-Verlag, of Stuttgart, Vol. 14/1, pp. 81-84 (1961). In the stagewise pressforming described below attention must be paid to a means for providing for the orderly escape of air. In accordance with the claimed teaching, in all the Examples illustrating the invention the polymer particles and the matrix polymer are mixed with the conducting substance at temperatures not exceeding the glass temperature Tg of the polymer particles, i.e., not exceeding Tg$_{dyn}$ of polymer minus 30° C. In all cases the starting temperature was room temperature (20 +/− 3° C.), and care was taken during the mixing to ensure that no substantial heating occurred which could lead to temperatures above Tg.

Other features of the invention will become apparent in the course of the following descriptions of exemplarity embodiments which are given for illustration of the invention are not intended to be limiting thereof.

EXAMPLES

I. Application of the Conducting Substances in a Milling Process

Example 1

Method for use of carbon black (Corax ®- type):

100 g of a bead polymer comprised of 94 wt. % methyl methacrylate and 6 wt. % methyl acrylate (material with mean particle size 130 micron, viscosity $\eta_{sp}/c = 67-73$ ml/g, namely the commercial product "Plexigum M286 ®" of Roehm GmbH) was mechanically premixed with the carbon black, followed by intensive mixing for 30 min in a centrifugal-force metal ball mill with vessel diameter 120 mm (model "S1" manufactured by the firm Retsch, of D-5657 Haan, FRG).

50 g of the thus prepared powder mixture was prepressure-formed in a hardened round press mold (diameter 120 mm) at 50 kp/cm$^2$ (=5 Newton force/cm$^2$) at room temperature, was then heated in a heating cabinet for 30 min at 220° C., and then pressed stagewise in the press under hot pressure-forming, to a maximum pressure of 200 kp/cm$^2$ (=20 Newton force/cm$^2$). Here and hereinafter (unless stated otherwise), the conductivity was determined with the multimegohmmeter of the firm Wissenschaftlich-Technische Werkstaetten, of D-812 Weilheim, FRG.

The press used was a 10 ton hand-lever press supplied by the firm Werner & Pfleiderer, of Stuttgart.

Example 1.1

0.12 g "Corax L ®" (specific surface 150 m$^2$/g) was used.

Conductivities measured: $5 \times 10^{-11}$ (ohm-cm)$^{-1}$ for test voltage 100 V; $2.5 \times 10^{-9}$ (ohm-cm)$^{-1}$ for test voltage 1000 V.

Example 1.2

0.2 g "Corax L ®" was used.

Conductivities measured: $2 \times 10^{-8}$ (ohm-cm)$^{-1}$ for test voltage 100 V; $6 \times 10^{-6}$ (ohm-cm)$^{-1}$ for test voltage 1000 V.

Example 1.3

0.3 g "Corax L ®" was used.

Conductivities measured: $4 \times 10^{-6}$ (ohm-cm)$^{-1}$ for test voltage 100 V; $2 \times 10^{-5}$ (ohm-cm)$^{-1}$ for test voltage 1000 V.

Example 1.4

3 g "Corax L ®" was used.

Conductivities measured: $2 \times 10^{-6}$ (ohm-cm)$^{-1}$ for test voltage 100 V; $7 \times 10^{-5}$ (ohm-cm)$^{-1}$ for test voltage 1000 V.

The pressure-formed plates according to Example 1 had a gray-black color. In other respects their properties were comparable to those of polymethyl methacrylate, and they could be processed by similar techniques to those used for polymethyl methacrylate.

Example 1.5

The method according to Example 4 was varied in that the conducting carbon black (3 g "Corax L ®") was applied to the beads by rolling it on, in successive portions of 0.5 g each.

Conductivity was measured on a "Metrawatt MAD" apparatus, supplied by the firm BBC/Goertz. The conductivity at 9 V test voltage was $5 \times 10^{-4}$ (ohm-cm)$^{-1}$.

Example 2

Method for use of carbon black (Corax ®-type):

99.5 g of a bead polymer comprised of 88 wt. % methyl methacrylate and 12 wt. % methyl acrylate (with no regulator added; cf. Example 1) was mechanically premixed with the carbon black, followed by intensive mixing for 30 min in the metal ball mill.

50 g of the thus prepared powder mixture was prepressure-formed stagewise in a round press mold (internal diameter 120 mm) at 50 kp/cm$^2$ (=5 Newton force/cm$^2$), then was heated in a heating cabinet for 30 min at 220° C., and then compressed stagewise under hot pressure-forming at 200 kp/cm$^2$ (=20 Newton force/cm$^2$), to yield a compact pressure-formed plate.

Example 2.1

0.5 g "Corax L ®" was used.

Conductivities measured: $7\times 10^{-8}$ (ohm-cm)$^{-1}$ for test voltage 100 V; $1\times 10^{-7}$ (ohm-cm)$^{-1}$ for test voltage 1000 V.

Example 2.2

1 g "Corax L ®" was used.

Conductivities measured: $3\times 10^{-6}$ (ohm-cm)$^{-1}$ for test voltage 100 V; $4\times 10^{-5}$ (ohm-cm)$^{-1}$ for test voltage 1000 V.

The pressure-formed plates according to Example 2 had a gray-black color, and they could be further processed by ordinary techniques used for polymethyl methacrylate.

Example 3

Method for use of carbon black (Corax ®-type):

99.5 g of a bead polymer as in Example 1 ("Plexigum M 286 ®", supplied by Roehm GmbH) was mechanically premixed with the carbon black, followed by intensive mixing for 30 min in the metal ball mill.

50 g of the thus prepared powder mixture was pre-pressure-formed stagewise in a round press mold (internal diameter 120 mm) at 50 kp/cm$^2$ (=5 Newton force/cm$^2$), then was heated in a heating cabinet for 30 min at 220° C., and then compressed stagewise under hot pressure-forming at 200 kp/cm$^2$ (=20 Newton force/cm$^2$), to yield a compact pressure-formed plate.

Example 3.1

1 g "Corax L ®" was used.

Conductivities: $8\times 10^{-6}$ (ohm-cm)$^{-1}$ for test voltage 100 V; $4\times 10^{-5}$ (ohm-cm)$^{-1}$ for test voltage 1000 V.

Example 4

Method for use of carbon black ("Ketjen-Black" type):

100 g of a bead polymer as in Example 1 was mechanically premixed with the conducting carbon black, followed by intensive mixing for 10 min in the centrifugal-force metal ball mill. The material was then pre-pressure-formed in a round press mold (internal diameter 120 mm), was then heated in a heating cabinet for 30 min at 220° C., and then compressed stagewise while hot in the press at 50 kp/cm$^2$ (=5 Newton force/cm$^2$). Conductivity measurements were then made on the thus-manufactured pressure-formed plate, at various measurement voltages.

Example 4.1

0.02 g "Ketjen-Black" carbon black was used.

Conductivities: $4\times 10^{-8}$ (ohm-cm)$^{-1}$ for test voltage 100 V; $4\times 10^{-6}$ (ohm-cm)$^{-1}$ for test voltage 1000 V.

Example 4.2

The test was analogous to Example 4.1 but with cold pressure-forming instead of hot pressure-forming, at pressures up to 50 kp/cm$^2$ (=5 Newton force/cm$^2$).

Conductivities: $8\times 10^{-7}$ (ohm-cm)$^{-1}$ for test voltage 100 V; $1.5\times 10^{-6}$ (ohm-cm)$^{-1}$ for test voltage 1000 V.

Example 4.3

The test was analogous to Example 4.1, but with 99 g bead polymer and 1 g "Ketjen-Black".

Conductivity: $3\times 10^{-3}$ (ohm-cm)$^{-1}$ for test voltage 100 V.

Example 4.4

The test was analogous to Example 4.1, but with 95 g bead polymer and 5 g "Ketjen-Black".

Conductivity: $8\times 10^{-1}$ (ohm-cm)$^{-1}$ for test voltage 100 V.

The mechanical properties of the pressure-formed plates according to Example 4 were slightly inferior to those of the samples from Examples 1 and 2.

Example 5

Method for use of graphite:

A bead polymer comprised of 80 wt. % methyl methacrylate and 20 wt. % graphite powder (particle sizes in the range 15-50 micron; the product "KS44" of the firm Lonza AG, of Basel, Switzerland) was pre-compressed at 50 kp/cm$^2$ (=5 Newton force/cm$^2$), was then heated in a heating cabinet for 30 min at 200° C., and then compressed stagewise by hot pressure-forming at 200 kp/cm$^2$ (=20 Newton force/cm$^2$), to yield a compact pressure-formed plate.

Conductivities measured: $3\times 10^{-6}$ (ohm-cm)$^{-1}$ for test voltage 100 V; $3\times 10^{-5}$ (ohm-cm)$^{-1}$ for test voltage 1000 V. The conductivity was re-measured at 100 V test voltage, immediately after the measurement at 1000 V test voltage, giving a value which remained at on the order of $3\times 10^{-5}$ (ohm-cm)$^{-1}$ for the test voltage 100 V, i.e., the conductivity was about the same at 100 V as had been previously measured at 1000 V.

Example 6

Method for use of graphite:

98 g of a bead polymer as in Example 1 was intensively mixed 30 min with 2 g graphite powder (particle sizes in the range 2.5-10 micron; the product "KS 2.5" of the firm Lonza AG, of Basel, Switzerland) in the metal ball mill. 50 g of the mixture was then pre-compressed at 50 kp/cm$^2$ (=5 Newton force/cm$^2$). The material was then heated in a heating cabinet for 30 min at 220° C., and then compressed stagewise, in hot pressure-forming at 200 kp/cm$^2$ (=20 Newton force/cm$^2$), to yield a compact pressure-formed plate with diameter 120 mm. A conductivity of $10^{-5}$ (ohm-cm)$^{-1}$ was measured, for a test voltage of 100 V.

Example 7

Method for use of graphite:

95 g of a bead polymer as in Example 1 was intensively mixed for 30 min with 5 g graphite powder according to Example 5, in the metal ball mill (about 600 rpm; ball complement 5 of diameter 20 mm for each 1 of diameter 40 mm). 25 g of the mixture thus obtained was then pre-compressed at 50 kp/cm$^2$ (=5 Newton force/cm$^2$) in a pressure-forming mold having internal diameter about 120 mm. The material was then heated in a heating cabinet for 30 min at 220° C., and then compressed by hot pressure-forming at 200 kp/cm$^2$ (=20 Newton force/cm$^2$), to yield a compact pressure-formed plate.

A conductivity of $10^{-4}$ (ohm-cm)$^{-1}$ was measured, for a test voltage of 100 V.

Example 8

Method for use of metal powder (zinc powder):

The method was analogous to Example 1, but with 8 g zinc powder (mean particle size 60 micron; product of the firm Merck GmbH, of Darmstadt, FRG) instead of the carbon black.

The conductivity measured was $3 \times 10^{-8}$ (ohm-cm)$^{-1}$, for a test voltage of 100 V.

Example 9

Method for use of metal powder (zinc powder):

85 g of a bead polymer comprised of methyl methacrylate (with mean particle size c. 63 micron, viscosity $\eta_{sp}/c = 145$-$175$ cc/g, namely the commercial product "Plexigum M 449 ®" of Roehm GmbH) was intensively mixed wth 15 g zinc powder (mean particle size 60 micron; product of the firm Merck GmbH, of Darmstadt, FRG) for 10 min in the centrifugal-force metal ball mill. 25 g of the thus prepared mixture was pre-compressed stagewise in a press mold (see Example 7) at 100 kp/cm$^2$ ($=10$ Newton force/cm$^2$) at room temperature, and was then heated at 180° C. for 30 min under the pressure of the press. After cooling, the pressure-formed plate was removed from the mold and its conductivity was determined.

Conductivities measured: $4 \times 10^{-6}$ (ohm-cm)$^{-1}$ for voltage 100 V; $7 \times 10^{-5}$ (ohm-cm)$^{-1}$ for test voltage 1000 V.

The plate was then heated 10 min at 145° C., in a heating cabinet and was deep-drawn in a cap-shaped mold. The conductivity was measured in the region of maximum drawing (about 200%).

Conductivities measured: $3 \times 10^{-9}$ (ohm-cm)$^{-1}$ for test voltage 100 V; $1 \times 10^{-7}$ (ohm-cm)$^{-1}$ for test voltage 1000 V.

Example 10

Method for use of metal powder (copper powder):

80 g of a bead polymer according to Example 9 was intensively mixed with 20 g copper powder (mean particle size 60 micron; product of the firm EGA-Chemie, of D-7924 Steinheim, FRG) for 10 min in the centrifugal-force metal ball mill. 25 g of the thus prepared mixture was pre-compressed stagewise in a press mold (see Example 7) at 10 kp/cm$^2$ ($=10$ Newton force/cm$^2$), was then heated at 180° C. for 30 min in a heating cabinet, and then was compressed by stagewise hot pressure-forming at 60 kp/cm$^2$ ($=6$ Newton force/cm$^2$), to yield a compact pressure-formed plate.

Conductivities measured: $6 \times 10^{-11}$ (ohm-cm)$^{-1}$ for test voltage 100 V; $1.5 \times 10^{-6}$ (ohm-cm)$^{-1}$ for test voltage 1000 V.

The conductivity was then re-measured at 100 V test voltage immediately after the measurement at 1000 V test voltage, giving a value which remained on the order of $6 \times 10^{-6}$ (ohm-cm)$^{-1}$ for the test voltage 100 V.

Example 11

Method for use of short carbon fibers:

90 g of a bead polymer (according to Example 1) was mixed with 10 g short carbon fibers (mean fiber length and diameter 0.37 mm and 14.5 micron, respectively; electrical resistivity about $15 \times 10^{-3}$ ohm/cm; the product "Sigrafil-P ®" staple fibers, supplied by Sigri Elektrographit GmbH, of D-9801 Meitingen, FRG) for 1 hr in a porcelain ball mill run on a slowly rotating roll bank, was heated in a press mold (internal diameter 120 mm) 30 min at 220° C., and was compressed in the press by stagewise hot pressure-forming at 50 km/cm$^2$ ($=5$ Newton force/cm$^2$).

The conductivity of the finished pressure-formed plate was measured at $3 \times 10^{-6}$ (ohm-cm)$^{-1}$ for test voltage 100 V. The plate was a gray-black color.

Example 12

Method for use of short carbon fibers:

50 g of a bead polymer (according to Example 2; pigmented with titanium dioxide in the amount of 5 wt. %) was mechanically premixed with 45 g of a second bead polymer (according to Example 1) with 5 g carbon fibers (according to Example 11), followed by intensive mixing for 10 min in the centrifugal-force metal ball mill, and pre-compression in the press mold (according to Example 5) at 50 kp/cm$^2$ ($=5$ Newton force/cm$^2$) at room temperature, was then heated 30 min at 200° C., and then immediately compressed stagewise by hot pressure-forming at 50 kp/cm$^2$ ($=5$ Newton force/cm$^2$). The conductivity of the finished pressure-formed plate was measured at $6 \times 10^{-6}$ (ohm-cm)$^{-1}$ for test voltage 100 V. The plate was a light gray color.

Example 13

Method for use of a combustion-resistant doped material:

100 g of a bead polymer based on poly (tetrabromobisphenol A) di-(2-methacryloyloxyethyl) ether was mixed intensively with 0.8 g carbon black ("Corax L ®") for 30 min in the metal ball mill, was then heated 30 min at 200° C. in a heating cabinet, and then was compressed stagewise by hot pressure-forming at 100 kp/cm$^2$ ($=10$ Newton force/cm$^2$), to yield a compact pressure-formed plate. The conductivity of the finished pressure-formed plate was measured at $2.5 \times 10^{-4}$ (ohm-cm)$^{-1}$ for test voltage 100 V. The pressure-formed plate was not inflammable in air.

II. Application of the Conducting Substances in a Fluidized Bed Process

Example 14

Method for use of electrically conducting carbon black in a conducting varnish:

In a fluidized bed apparatus ("Uni-Glatt" of the firm Glatt GmbH, D-7851 Binzen/Loerrach, FRG), 200 g of a bead polymer according to Example 1 was coated with 400 g of a conducting varnish comprised of a ground granulate of a polymer based on ethyl methacrylate, in which the polymer had been polymerized without solvents or diluents in the polymerization mixture (the polymer being namely the product "Plexigum N 742 ®" of the firm Roehm GmbH, which product is of medium hardness, has $\theta_{sp}/c = 30$-$35$ ml/g, and has density 1.13 g/cc), the granulate being present in the varnish in the amount of 10 wt. %; the varnish further comprised of 1.5 wt. % conducting carbon black ("Corax L ®") and the remainder of the varnish comprising ethanol. 50 g of these beads which had been thus coated in a fluidized bed were pre-compressed stagewise by cold pressure-forming at 50 kp/cm$^2$ ($=5$ Newton force/cm$^2$) were then heated 30 min at 210° C. in a heating cabinet, and then were compressed stagewise by hot pressure-forming at 200 kp/cm$^2$ ($=20$ Newton force/cm$^2$), to yield a compact pressure-formed plate.

The conductivity of the finished pressure-formed plate was measured at $10^{-2}$ (ohm-cm)$^{-1}$ for test voltage 100 V.

Example 15

200 g of a bead polymer comprised of 87 wt. % methyl methacrylate, 12 wt. % methyl acrylate and 1 wt. % ethylene glycol dimethacrylate was treated analogously to Example 14. The resulting pressure-formed plate had a conductivity of $4 \times 10^{-4}$ (ohm-cm)$^{-1}$ for a test voltage 100 V.

Example 16

Method for use of electrically conducting carbon black:

In a fluidized bed apparatus ("WSG 5", standard production model of the firm Glatt GmbH, D-7851 Binzen/Loerrach, FRG), 5000 g of a bead polymer according to Example 1 was coated with 4000 g of a conducting varnish comprised of a 2.5 wt. % solution of "Plexigum N742 ®" (see Example 14) in ethanol, the varnish being further comprised of 1.25 wt. % "Corax L ®" conducting carbon black.

100 g of these beads which had been thus coated were pre-compressed stagewise at 50 kp/cm$^2$ (=5 Newton force/cm2) by the standard technique, were then heated 30 min at 220° C. in a heating cabinet, and then were compressed stagewise by hot pressure-forming at 200 kp/cm$^2$ (=20 Newton force/cm$^2$), to yield a compact pressure-formed plate.

The conductivity for the finished pressure-formed plate was measured at $10^{-3}$ (ohm-cm)$^{-1}$ for test voltage 100 V.

III. Manufacturing of Agglomerate Pressed Plates

Example 17

50 g of a bead polymer according to Example 9 was pre-compressed in a press mold (round, with internal diameter 120 mm) for 1 hr at 140° C. and pressure 100 kp/cm$^2$ (=10 Newton force/cm$^2$), to yield a "sintered" agglomerate pressure-formed plate. A conducting varnish according to Example 13 was applied to one face of this plate in the amount of about 100 mg/cm$^2$. The plate was then dried, whereby it was rendered non-transparent. It was then heated 30 min in a heating cabinet, and was compressed stagewise by hot pressure-forming at 200 kp/cm$^2$ (=20 Newton force/cm$^2$), to yield a compact pressure-formed plate. The surface conductivity of the finished pressure-formed plate was measured at $1.5 \times 10^{-3}$ test (ohm-cm)$^{-1}$ voltage 100 V. The plate was optically dense.

Example 18

Analogously to Example 17, an agglomerate pressed plate was produced which was coated with a conducting varnish containing 20 wt. % copper powder in place of the conducting carbon black. The surface conductivity of the finished pressure-formed plate was measured at <1 (ohm-cm)$^{-1}$ for test voltage 100 V. The plate was optically dense.

Example 19

50 g of a bead polymer (according to Example 9, sieve-fractionated, with mean bead diameter 0.12 mm) was pre-compressed in a press mold at 140° C. with no applied pressure, for 2 hr, to yield an agglomerate compressed plate. Copper powder (see Example 10) was brushed onto both sides of the porous plate in the amount of 10 mg powder per cm$^2$ surface, and rubbed smooth by hand. After heating 30 min in an oven at 180° C., the plate was compressed stagewise by hot pressure-forming at 100 kp/cm$^2$ (=10 Newton force/cm$^2$), to yield the finished pressure-formed plate. The surface conductivity of the finished pressure-formed plate was measured at $4 \times 10^{-6}$ (ohm-cm)$^{-1}$ for test voltage 100 V. Plates of this type had light permeability of up to 40%.

Example 20

Analogously to Example 18, an agglomerate pressed plate was coated on one side with zinc powder (see Example 9). After heating in the oven, the plate was compressed stagewise by hot pressure-forming at 100 kp/cm$^2$ (=10 Newton force/cm$^2$), to yield a compact pressure-formed plate having a light permeability of 35%. The surface conductivity was measured at $3 \times 10^{-6}$ (ohm-cm)$^{-1}$ for test voltage 100 V.

Example 21 (Comparison Example)

50 g conducting carbon black ("Corax L ®") was stirred into 200 ml methyl methacrylate, and polymerization was carried out in customary fashion between glass discs provided with distance maintaining means, for 62 hr at 55° C. in a water bath, with the aid of a special added hardener system comprised of dibutylamine hydrochloride (0.01 wt. %), cyclohexanone peroxide (0.6 wt. %), vanadyl phosphate (0.35 wt. %; product "VN 2" of the firm Akzo), and bis(p-toluenesulfonylmethyl)amine (0.35 wt. %) with the wt. % figures based on the amount of monomer. This produced a plate. The conductivity of the plate was measured at $7 \times 10^{-6}$ (ohm-cm)$^{-1}$ for test voltage 1000 V. With other conditions equal, use of <25 wt. % carbon black gave conductivity below measurability. Carbon black concentrations >25 wt. % could not be dispersed.

Example 22

Method of producing a bead polymer:

The bead polymerization was carried out with no applied pressure, under nitrogen atmosphere. The water phase contained a dispersing agent (e.g., 1 part by wt. aluminum hydroxide) and an auxiliary dispersing agent (e.g., 0.02 part by wt. sodium alkyl sulfonate with about 10-20 C atoms).

The water phase was heated to 75° C. in a 2- liter round bottom flask. Then 200 part by wt. monomer and 1 part by wt. peroxide initiator were added. After polymerization about 3 hr at 75° C. and 1 hr at 85° C., the beads were filtered out, washed, and dried in a warm oven. If desired, they could be fractionated in a sieve shaker.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrically conductive solid thermoplastic, which consists essentially of:
    a) bead-shaped particles of substantially non-crystalline polymethyl methacrylate polymer having a mean particle diameter in the range of about 10-1,000 μm, and b) carbon black, as an electrically conducting substance, substantially all of which is present on the surface of said polymer particles, in an amount of 0.05-5 wt. %, based on the weight of the polymer, wherein said electrically conductive substance is in the form of a plurality of conducting particulate solid bodies, and further wherein the glass transition temperature of said polymer is not exceeded when the conducting substance is mixed with said polymer particles.

2. The electrically conductive solid thermoplastic of claim 1, wherein said bead-shaped polymer particles have a mean particle diameter in the range of 30-300 μm.

3. The electrically conductive solid thermoplastic of claim 1, wherein said bead-shaped polymer particles have a mean particle diameter in the range of 30-100 μm.

4. The electrically conductive solid thermoplastic of claim 1, wherein greater than 95% of the bead-shaped polymer particles have a particle size distribution in the range of about 10-1,000 μm.

5. The electrically conductive solid thermoplastic of claim 1, wherein greater than 99% of the bead-shaped polymer particles have a particle size distribution in the range of about 10-1,000 μm.

6. The electrically conductive solid thermoplastic of claim 1, wherein said polymer particles are produced by a bead polymerization technique.

7. The electrically conductive solid thermoplastic of claim 1, wherein the amount of said carbon black is 0.1-5.0 wt. % based on the weight of the polymer.

8. The electrically conductive solid thermoplastic of claim 1, wherein the surface per unit weight value of said conductive carbon black is 15-1,500 $m^2/g$.

9. The electrically conductive solid thermoplastic of claim 1, further comprising finely dispersed inert inorganic filler, in an amount of up to 70 wt. % of the total weight of the plastic.

10. The electrically conductive solid thermoplastic of claim 1, wherein said conductive substance is mixed with said polymer particles by a fluidized bed technique.

11. The electrically conductive solid thermoplastic of claim 1, wherein said conductive substance is mixed with said polymer particles by a milling or grinding technique.

12. The electrically conductive solid thermoplastic of claim 1, wherein said thermoplastic is produced by:
 a) mixing at ambient temperature said polymer particles, and said conductive particulate solid bodies, top thereby coat substantially all of said bodies on the surface of said polymer particles; and
 b) sintering the coated polymer particles, thereby forming said solid conductive bodies.

* * * * *